March 16, 1926.
V. BIBO
1,576,501
FOLDABLE BABY CARRIAGE
Filed Nov. 6, 1924 2 Sheets-Sheet 1
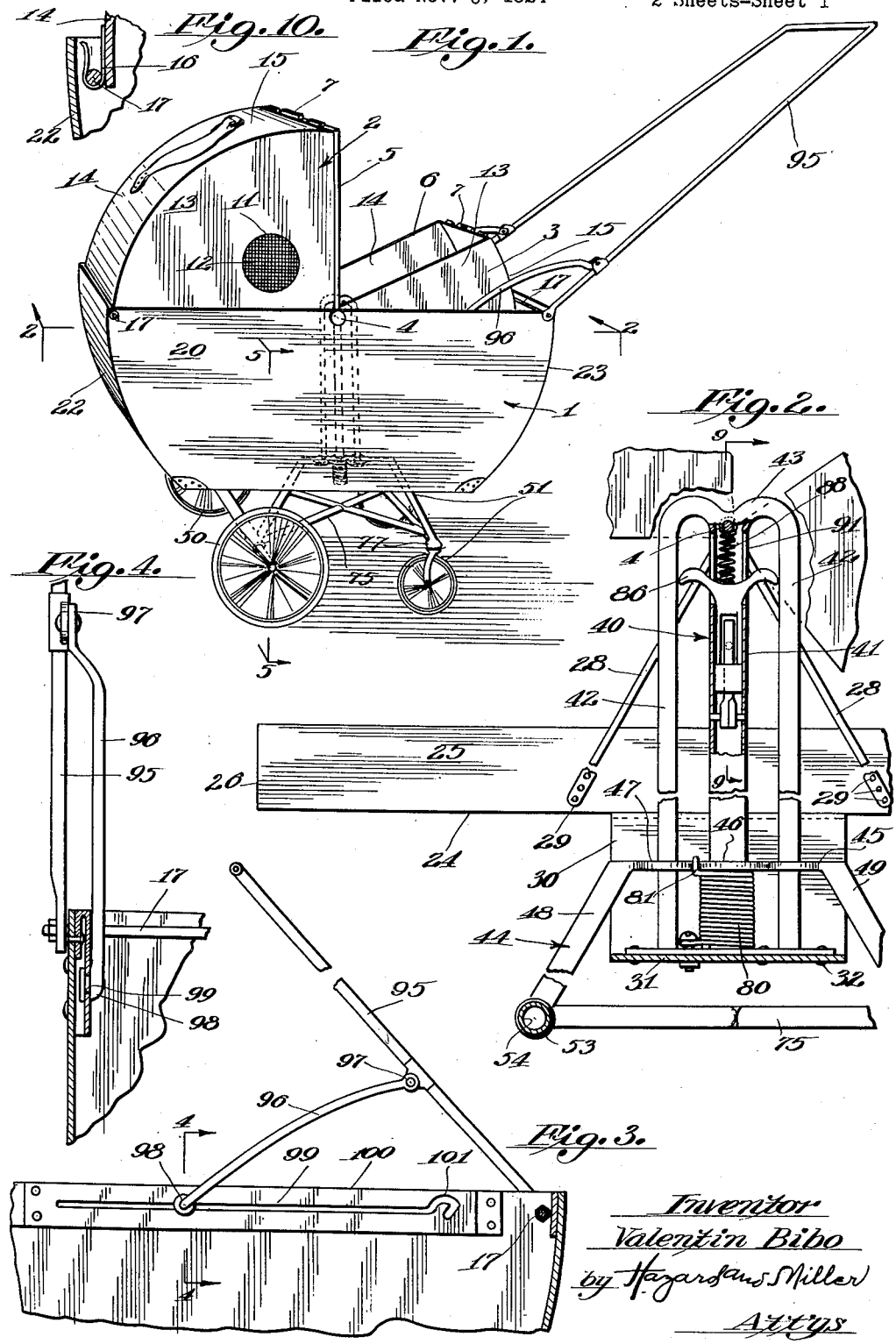
Inventor
Valentin Bibo
by Hazard and Miller
Att'ys March 16, 1926.                    1,576,501
V. BIBO
FOLDABLE BABY CARRIAGE
Filed Nov. 6, 1924    2 Sheets-Sheet 2
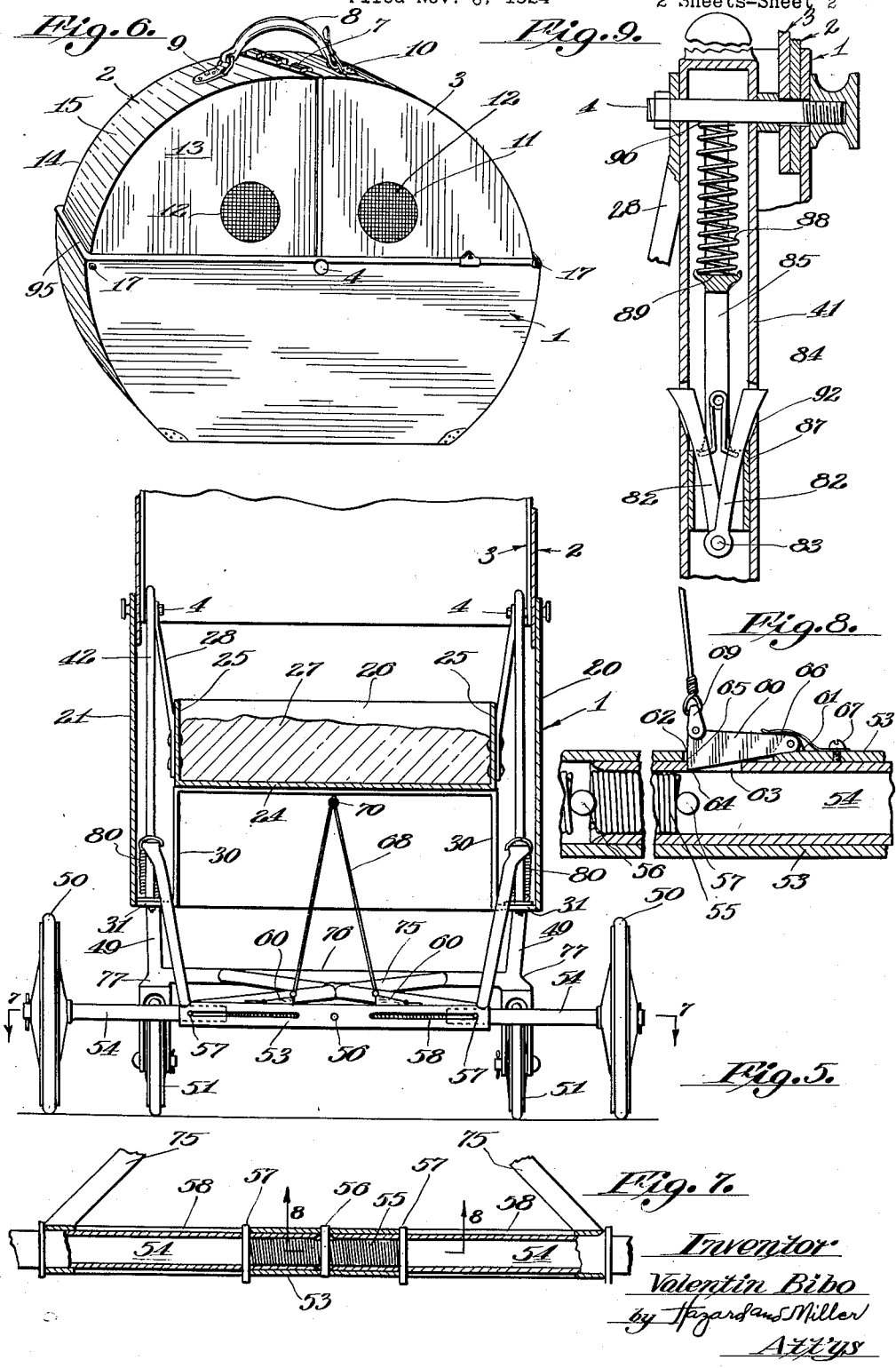

Patented Mar. 16, 1926.

1,576,501

UNITED STATES PATENT OFFICE.

VALENTIN BIBO, OF LOS ANGELES, CALIFORNIA.

FOLDABLE BABY CARRIAGE.

Application filed November 6, 1924. Serial No. 748,177.

*To all whom it may concern:*

Be it known that I, VALENTIN BIBO, a citizen of Germany, residing at Los Angeles, in the county of Los Angeles and State of California, have invented new and useful Improvements in Foldable Baby Carriages, of which the following is a specification.

My invention relates to portable baby carriages of the type in which the wheels are housed in the body of the carriage and a hood is provided whereby the device makes a compact parcel which may be carried in the hand with the infant inside if desired.

I provide a body structure with wheels supported on a framework in which manner that they can be telescoped axially and then pressed upward into a housing in the body and retained in place completely out of sight.

The hood or cover is formed in two segments which telescope at the head and foot of the carriage and may be used as a storm cover for the infant and as a closure when it is desired to carry the carriage. The handle is pivoted at one end and folds to form a rim on the upper edge of the carriage body.

My foldable baby carriage is of a neat appearance when open and when folded is of a style similar to a lady's hatbox.

My invention will be more clearly understood by the following specification and accompanying drawings, in which—

Figure 1 is a perspective view of the carriage in its open or operating position.

Fig. 2 is a side elevation partly in section of the main metal framework in the direction indicated by the arrows 2—2 in Fig. 1.

Fig. 3 is a detail of the folding handles in side elevation.

Fig. 4 is a detail of the handles in end elevation on the line 4—4 of Fig. 3.

Fig. 5 is a cross section substantially on the line 5—5 of Fig. 1.

Fig. 6 is a view of the carriage in its folded or carrying position.

Fig. 7 is a section of the main axle on the line 7—7 of Fig. 5 with the wheels telescoped inward.

Fig. 8 is a section of Fig. 7 on the line 8—8 illustrating the locking latch for the telescoping wheels.

Fig. 9 is a section of the frame on the line 9—9 of Fig. 2 illustrating the latch for holding the wheels in the housed position.

Fig. 10 is a detail sectional view of hooks for holding the hoods in closed position.

Referring to Fig. 1, the body of the carriage 1 has hoods 2 and 3 mounted on pivotal bolts 4 and the hood 2 has a beading 5 engaging the edge 6 of the hood 3 and both members are provided with latches and locks 7 to securely lock the carriage closed. A carrying handle 8 is secured to the hood 2 by the eye 9 and may be buckled in an eye 10 in the hood 3. Apertures 11 with screens 12 are provided in the side of the hood to allow ventilation when closed. Each hood has flat side walls 13 and 14 and a curved top 15. Each hood is provided with a latch 16 engaging a rod 17 which passes through the main body, thereby holding either hood in elevated position.

The main body of the carriage 1 has two side walls 20 and 21, and end walls 22 and 23 and supports a bed 24 for the infant. This bed is illustrated with side walls 25 and end walls 26 containing the bedding 27. The bed is supported from the main pivotal bolts 4 by bars 28 secured to the sides 25 by screws 29 or other suitable fastenings.

Rigidly attached to the bottom of the bed are angular brackets 30 extending down sufficiently to connect with an angle 31 formed on the lower edge of the sides 20 and 21. These parts are secured together by rivets 32 or other suitable fastenings.

A guiding and locking frame 40 is rigidly attached to the brackets 30 and engages the main pivots 4 at its upper portion, thereby forming a rigid frame. This is illustrated as having a central tube 41 and two parallel tubes or bars 42 curved or otherwise suitably connected at the top 43. The frame 40 carries slidable thereon wheel frames 44 which are built up of a top plate 45 having an aperture 46 for the central tube 41 and apertures 47 for the side tubes 42. A front bar 48 and a rear bar 49 extend downwardly to the wheels.

The wheels are preferably made with large rear wheels 50 and small wheels 51. The large wheels are preferably mounted in a telescopic manner by means of a hollow axle 53 in which the wheel axles 54 may telescope. Springs 55 are secured in the central portion of the hollow axle by means of a pin 56. The sliding axles carry pins 57 operating in slots 58. By this arrangement the wheels are normally pressed outward into the position shown in Fig. 5.

They are latched in inward position by means of a latch 60 pivotally mounted on lugs 61 and the hollow axle 53. These latches may press downward through a slot 62 in the hollow axle and engage in a slot 63 in the sliding axle catching an abutment 64 by the latch face 65. The latches are normally pressed downward by a spring 66 secured by a screw 67 to the axle 53. When the carriage is in operative position the latches 60 are held upward by cords 68 secured to links 69 on the latches and to an eye 70 on the bottom of the child's bed or other part of the structure. These cords are of a fixed length and when the wheels are moved from their housing as hereinafter explained, the latch 61 is pulled upward disengaging its face 65 from the abutment 64 of the axles 54 which is immediately forced outward by the springs 55.

The front wheels are secured to the rear axle in a fixed position by a cross frame 75 and front axle 76. The front wheels preferably have a caster swivel mounting 77 formed at the lower end of the rear bar 49.

When the large wheels are telescoped axially and held inward as above described, the wheel frame is in the position for housing in the body in the following manner:

As above described, the central tube 41 passes through an aperture 46 in the plate 45 and the side tubes 42 through apertures 47 in this plate. A pressure is placed on the top of the carriage which extends the spring 80 attached at its upper end 81 to the plate 45 and at its lower end secured to the brackets 30 and angle 31. The plate 45 slips up the central tube 41 and side tubes 42 until it engages dogs 82 having a pivotal mounting 83 on the tube 41. These latches are normally pressed outwardly by the coil spring 84 on the sliding bar 85. This bar is formed with finger grips 86 and at its lower end has a ring 87 sliding in the tube 41, the whole being normally pressed downward by the spring 88 engaging the top of the bar 85 at 89 and the main pivot pin 4 at 90. The finger grips slide through slots 91 in the tube 41 and when they are pulled upward elevate the ring 87 which forces the dogs 82 inward through the slots 92 in the tube 41. This will free the plate 45 which has been held upward by these dogs. The tension of the spring 80 now pulls the bar 45 downwardly and the wheel frames out of their housing. When extended to their proper distance, the cords 81 pull the latches 60 which allow the large wheels to be moved axially outwardly to the position of Fig. 5. The springs 80 also give resiliency to the whole baby carriage when in operative position, as shown in Figs. 1 and 5.

The handle 95 is pivoted to the bar 17 and when folded downwardly forms a neat rim to the carriage body as shown in Fig. 6.

The handle is held in operative position by the links 96 pivoted to the handle 97 and having an angular end 98 sliding in a slot 99 formed in a bar 100 attached to the side walls 20 and 21 of the carriage by any suitable means. The slot 99 is made hook-shaped at the rear end so that the bent end 98 will engage therewith when the handle is in operative position, as shown in Fig. 1, and hold it securely in place.

Various changes may be made without departing from the spirit of the invention as claimed.

I claim:

1. A foldable baby carriage, comprising in combination a bed element, a pair of angular brackets depending therefrom, a pair of upright parallel bars connected to each of said brackets, a central tube between the bars and connected to the bracket, a wheel frame having top plates with apertures therethrough for the rods and the central tubes, axles operatively connected to the wheel frame and springs positioned between the brackets and the wheel frame.

2. A foldable baby carriage as claimed in claim 1, having slots in the central tube, a rod slidable in said tube, a ring on the end of the rod, a pair of dogs pivotally mounted in the central tube and adapted to extend through the slots and operatively engaging the ring, and means to operate the rod.

3. A foldable baby carriage as claimed in claim 1, having in addition oppositely positioned upper slots in the central tube, a rod slidable in said tube having finger grips extending laterally through the upper slots and having a ring at its lower end, a spring bearing on the upper end of the rod and a pair of dogs pivotally connected to the central tube extending through the said ring and adapted to project outwardly through a pair of oppositely positioned lower slots in the tube.

4. A foldable baby carriage comprising a carriage body having sides and ends and normally open at the top, bolts inserted through the sides at their longitudinal centers and near their upper edges, hoods pivotally mounted upon the bolts and adapted to swing to and from each other, rods inserted through the sides near their ends, latches carried by the hoods and adapted to engage the rods when the hoods are closed, a carrying handle secured to one hood by an eye and adapted to be buckled through an eye on the other hood.

5. A foldable baby carriage comprising a carriage body having vertical sides and ends, a housing in the lower part of the carriage body, a bed frame above the housing, a vertical guiding and locking frame in the housing, a wheel frame mounted to move up and down on the vertical guiding and locking frame, wheels upon the wheel frame and adapted to be enclosed in the housing out of sight when the wheel frame is in its upward position, bolts inserted through the sides at their longitudinal centers and near their upper edges, hoods pivotally mounted upon the bolts and adapted to swing to and from each other, rods inserted through the sides near their ends, latches carried by the hoods and adapted to engage the rods when the hoods are closed, a carrying handle secured to one hood by an eye and adapted to be buckled through an eye on the other hood.

6. In a foldable baby carriage, a carriage body, a wheel frame mounted to move up and down in the carriage body, a hollow axle fixed in the wheel frame, wheel axles slidably mounted in the hollow axle, springs in the hollow axle to press the wheel axles outwardly and latches to hold the wheel axles inwardly.

7. In a foldable baby carriage, a carriage body, wheel frames and wheels therefor, a resilient mounting for the body on the wheel frames comprising vertical bars or tubes, a plate adapted to slide thereon and connected to the wheel frames, an extensible spring attached to said plate and to a fixed position on the carriage body, a housing on the carriage body, and means to hold the wheel frame and wheels in said housing comprising dogs engaging said plate with the spring in an extended position whereby on release of said dogs the wheel frame and wheels in said housing will be forced out of the housing.

In testimony whereof I have signed my name to this specification.

VALENTIN BIBO.